United States Patent [19]
Ballmoos et al.

[11] 3,845,351
[45] Oct. 29, 1974

[54] METHOD AND APPARATUS FOR THE ADJUSTMENT OF A PLURALITY OF FLOODLIGHTS

[76] Inventors: Fritz von Ballmoos, Todistrasse 44, 8810 Horgen; Traugott Grieder, Siegwaldweg 45 4125 Riehen, both of Switzerland; Herbert Grohmann, Alexanderstrasse 158, Stuttgart, Germany; Rolf Gutmann, Flughafenstrasse 6, 4000 Basel, Switzerland

[22] Filed: Mar. 1, 1971

[21] Appl. No.: 119,595

[30] Foreign Application Priority Data
Mar. 5, 1970  Switzerland.................. 3217/70

[52] U.S. Cl. ............................ 315/293, 240/3
[51] Int. Cl. .................... G05f 1/00, F21p 5/00
[58] Field of Search ...................... 315/292–295, 315/316–317; 240/3; 340/339, 172.5

[56] References Cited
UNITED STATES PATENTS

| | | |
|---|---|---|
| 3,265,932 | 8/1966 | Pettersson et al. ............. 315/292 |
| 3,448,338 | 6/1969 | Bentham et al. ................ 319/295 |
| 3,508,113 | 4/1970 | Isaacs ............................ 315/297 X |
| 3,514,670 | 5/1970 | Isaacs ............................ 315/292 |
| 3,579,030 | 5/1971 | Bentham et al. ............... 315/316 X |

*Primary Examiner*—James J. Gill
*Assistant Examiner*—Daniel M. Yasich
*Attorney, Agent, or Firm*—Werner W. Kleeman

[57] ABSTRACT

An apparatus for adjusting a number of floodlights, especially for the illumination of a stage or studio, in which each of the parameters azimuth, elevation, brightness, focus and color of a bundle of light rays of each floodlight are adjusted to an optimum value for any one of a plurality of lighting effects. A housing attached to each floodlight is provided for the means for adjusting each of the parameters, for generating signals corresponding to the actual values of the respective parameters, and a control circuit for generating a signal according to the difference between a reference value and said actual value to control the associated adjustment means.

1 Claim, 2 Drawing Figures

METHOD AND APPARATUS FOR THE ADJUSTMENT OF A PLURALITY OF FLOODLIGHTS

BACKGROUND OF THE INVENTION

The present invention relates to an improved method of, and apparatus for, the adjustment of a plurality of floodlights or the like, especially used for the illumination of a stage or a studio.

During the illumination of an area, such as typically a stage or a studio, wit the use of a plurality of floodlights or the like the individual lighting effects are determined by the number and location of such floodlights and by the direction, focusing, brightness and colour of the individual bundle of light rays. The floodlights are preferably arranged at illumination ramps and electrically coupled by a cable with a central amplification installation for the purpose of supplying power to the lighting system. The brightness of the floodlights is controlled from a control position through the agency of this amplification installation, while the direction and focusing as well as the interposing of colour filters or light diaphragms or masks are regulated by the operating personnel working upon the illumination ramp. It should be understood, in particular, that the manual adjustment of the floodlights can only be undertaken relatively slowly, and that the required adjustments cannot always be exactly duplicated, therefore oftentimes must be readjusted, and only then through the use of highly qualified operating personnel who are accustomed to working with one another over a longer period of time. Even so, the central control of the brightness of the floodlights also has associated therewith certain drawbacks. The brightness is generally adjusted by magnetic amplifiers or controlled solid semiconductors which control the phase angle when there is turned-on the current of the supply voltage. In so doing, the displacement of a phase angle is generally perfected through the agency of a motor-driven potentiometer and/or adjustment lever, accounting for the fact that the adjustment time is a function of the difference of the brightness or intensity which is to be regulated, and likewise can be very long. Additionally, the cables leading from the amplification installation to the illumination ramp, and which generally are very long, exhibit a high voltage drop, so that to compensate for such voltage drop it is necessary to couple in front of the brightness or intensity control equipment a high-power step-up transformer.

Accordingly, a number of apparatus structures and arrangements have become known to the art in order to at least partially alleviate these drawbacks. Thus, as proposed in one prior art arrangement a large number of fixedly adjustable floodlights are employed, each of which is then only switched-on when its particular setting is required. The drawback of such an expensive arrangement which similarly requires a great deal of space should be readily apparent.

Further, apparatus constructions are also known in the art in which the control position is controlled by data carriers, for instance perforated or punched cards. While this technique indeed renders possible automatization of the work of the lighting effects head, still the manual adjustment of the floodlights at the ramp must be carried out as was heretofore required and described above.

SUMMARY OF THE INVENTION

Therefore, there is still present a real need in the art for a method of, and apparatus for, adjusting a plurality of floodlights or the like, especially for illumination of a stage or studio, which is not associated with the aforementioned drawbacks of the prior art techniques and apparatus constructions. Therefore, a primary objective of the present invention is to fullfil the existing need in the art and to overcome the aforementioned drawbacks of the prior art techniques and equipment.

The inventive method for the adjustment of a plurality of floodlights, especially for the illumination of a stage or studio, and wherein the floodlights are arranged to be pivotable, and exhibit colour filters and/or diaphragms and the brightness or intensity of which and the focusing of which is adjustable, is manifested by the features that the reference values for azimuth, elevation, colour, brightness and focusing of the bundle of light rays for each of the employed floodlights and determined during a trial illumination run for a given lighting effect or a number of lighting effects is transferred to a data carrier, and for each adjustment of this lighting effect or lighting effects these reference values are again retrieved or read-out from the data carrier.

The invention also contemplates apparatus for the performance of the aforesaid method which is characterized by the features that each flood-light is provided with means for the adjustment of azimuth, elevation, brightness, focus and colour of the bundle of light rays, and signal transmitters which generate signals corresponding to the actual values of these magnitudes or parameters. Additionally, for each of the aforementioned magnitudes there is provided a control device which connects the associated means and the associated signal transmitter into a control circuit, and there is also provided at least one device for introducing variable reference values into such control devices.

By virtue of the new and improved method of the present invention and the apparatus contemplated for the performance of such method it is possible to store all of the magnitudes or parameters of a practically unlimited number of lighting effects for an optional great number of floodlights upon a data carrier and at a later time to either use such information in the stored sequence or in a different optional sequence for the automatic setting or for the repetition of one or all lighting effects. Consequently, there is rendered possible for the first time that all parameters or magnitudes of a multiplicity of lighting effects can be reproduced exactly and as often as desired. However it is also possible to accommodate the magnitudes which are to be reproduced to a different situation by means of a correction value which is introduced by a direction or control console. The apparatus of the present invention can be equipped with a relatively light and thus portable command or direction console, which preferably is erected in such a manner that the direct effect of each new adjustment or setting can be observed from the console. Finally the inventive method also affords considerable economical advantages in that for instance there is rendered possible a practically complete saving of the operating personnel which otherwise normally works at the illumination ramps.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENTS

Figure 1:
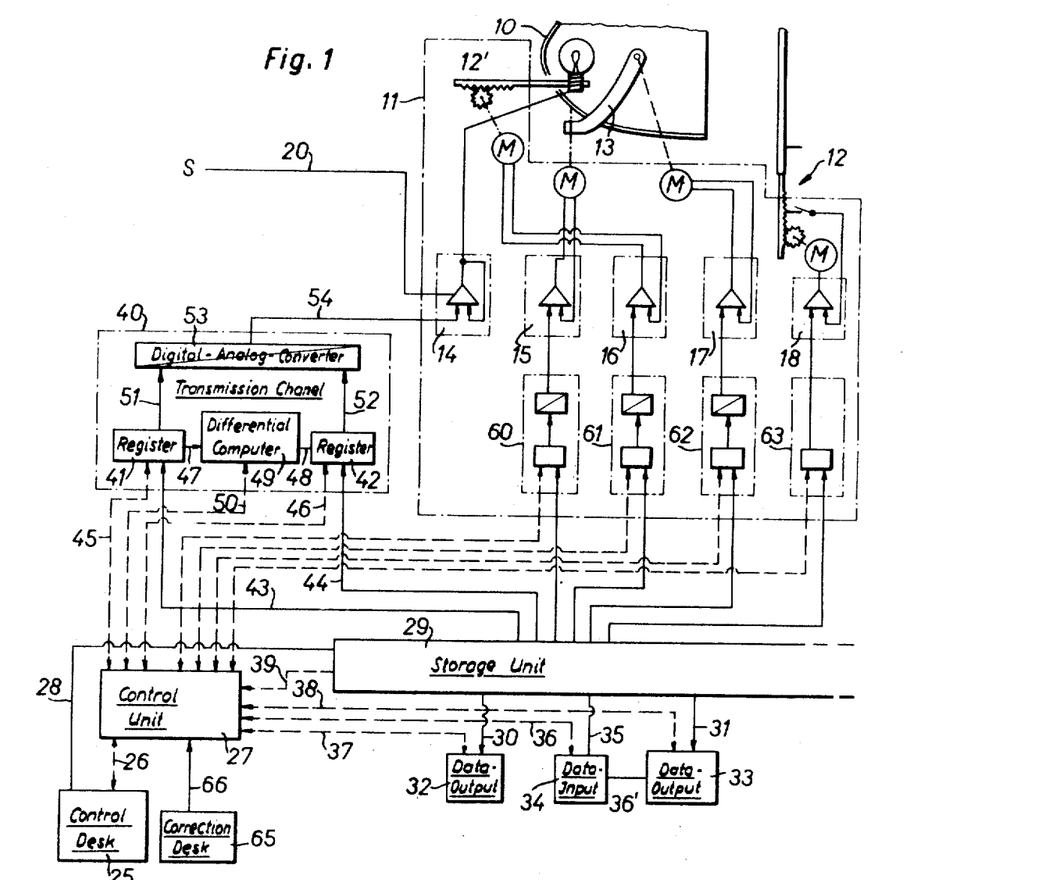
FIG. 1 is a block circuit diagram of a first embodiment of inventive apparatus used for the performance of the inventive method and which is equipped at its transmission channel with a digital operating mixing or overblending device.

Describing now the drawings, in the schematically illustrated embodiment of inventive apparatus of FIG. 1 there has been depicted therein for the sake of simplicity and clarity only one of a number of floodlights or the like and only one of a number of signal transmission lines for such floodlight used for the transmission of the reference values of the magnitudes which are to be regulated or adjusted. Since the apparatus for the most part is composed of electronic components and circuits known to those skilled in the art circuit details will not be therefore explained to any greater extent than necessary for understanding and appreciating the underlying concepts of the present invention.

The floodlight 10 depicted in FIG. 1 is attached to a suitable conventional Cartesian or Cardan suspension system 13 and can be positionally adjusted elevationally and laterally by means of corresponding motors. The floodlight 10 likewise possesses mechanisms 12, 12' for interposing colour filters and/or light diaphragms and for focusing the bundle of light rays. Many systems suitable for this purpose are known to the art and can be advantageously employed in the invention. Continuing, it will recognised that a control cabinet 11 is attached with the floodlight housing, control cabinet 11 containing means for adjusting the brightness of the lamp or floodlight, preferably a controlled solid semiconductor and a control circuit 14 utilized for controlling such solid semiconductor. Additionally, the control cabinet 11 further incorporates respective control circuits 15, 16, 17 and 18 for azimuth, elevation, focus and colour required for setting or adjusting a lighting effect. Each of the control systems comprises a signal generator which delivers a signal corresponding to the actual value of the magnitude controlled by this circuit. There is advantageously used as the actual value of the floodlight intensity or brightness the voltage which is measured at such floodlight. As the acutal value for the adjustment of the azimuth, elevation and focus there can be used the voltage appearing at a displaceable tap of a potentiometer coupled with the corresponding movement, and as the actual value-transmitter for the position of the colour filter or the light diaphragm there can be used a terminal switch which is actuated owing to the displacement of the filter or diaphragm. Furthermore, the control cabinet 11 is coupled through the agency of a line or conductor 19 with a supply voltages rail 20 delivering both the voltage for the floodlight lamps as well as for the mentioned control amplifiers, control circuits and the means employed for regulating or adjusting the aforementioned parameters or magnitudes, such as for instance motors and electromagnets.

Additionally, it will be seen that the inventive equipment contains a command- or direction console or desk 25 constructed in module or building-block manner and the individual modules or building-blocks of which correspond to the dummy schematic of the arrangement of the floodlights. The command console 25 does not contain any components, such as for instance potentiometers or motors for the control of the brightness or intensity of the floodlights, rather only contains operating- and indication elements. Therefore, it is of relatively lightweight and is preferably designed as a portable console unit. According to a preferred embodiment there can be used as the indication elements luminous buttons or the like, the luminous intensity of which corresponds to the intensity or brightness of each associated floodlight. The command console 25 is coupled via control conductors 26 with an electronic control unit 27, a computer for instance, and via information conductors 28 with an electronic storage means 29, in the prsent case constituted by a ferrite-core memory. Two information conductors 30 and 31 lead from the electronic storage or memory unit 29 to two output devices, namely the perforated tape puncher 32 and the automatic recording or transcribing unit 33. Furthermore, there is provided a data input device constructed in the form of a perforated tape reader 34 which is connected via a first information line or conductor 35 with the electronic storage unit 29 and via a second information line or conductor 36' with the automatic recording unit 33. Additionally, the data input unit 34 and the data output units 32 and 33 are connected via control lines 36, 37 and 38 with the control unit 27.

It should be understood that as the storage unit 29 there can also be used a semiconductor- or plate storage, and that for the output device 32 or 33 there can also be used a magnetic tape recorder, and as the data input device 34 instead of the perforated tape reader there can also be used a different known mechanism.

The electronic storage unit 29 contains sufficient storage positions in order to store for each floodlight or lamp of the installation the required control commands for each magnitude required to set a certain lighting effect.

Each control circuit or amplifier 14, 15, 16, 17 and 18 of the floodlight 10 is connected via an associated transmission channel-- of which only the channel 40 used for the adjustment of the brightness or intensity has been shown in detail while the other channels 60, 61, 62 and 63 have only been schematically indicated-- with the storage unit 29. At the storage unit 29 there are stored in digital form the values corresponding to the required adjustments, whereas the actual values delivered by the control circuit and the actual value transmitter means are preferably in analogue form. Now in order to be able to compare at the control amplifiers these analogue actual values with the digital reference values removed fromthe storage unit 29 the digital reference values are converted into analogue values at a digital-analogue converter forming a part of the transmission channel 40. It is thus possible to carry out the transition of the stored reference values from one adjustment to the other and particularly the mixing or over-blending of the brightness with the digital reference values, that is prior to conversion or with the analogue reference-values, that is after conversion. The transmission channel 40 depicted in FIG. 1 and provided for the mixing or overblending with digital values contains two digital storage units 41, 42 which for instance are constructed as counters which can be set to count forwards and backwards and each of which is connected via an information line or conductor 43 and 44, respectively, with the electronic storage unit 29 and via a control line 45 and 46, respectively, with the control unit 27. A first respective output of such direct storage units or registers 41 and 42 is connected via an information line or conductor 47 and 48, respectively, with one of the inputs of a differential computer 49, the output of which is connected via a further control line 50 with the control unit 27. The second output of each direct storage unit 41 and 42 is connected via a respective information line or conductor 51 and 52 with a digital-analogue converter 53, the output of which is connected via an information line 54 with the control amplifier 14 associated with the channel 40.

Figure 2:
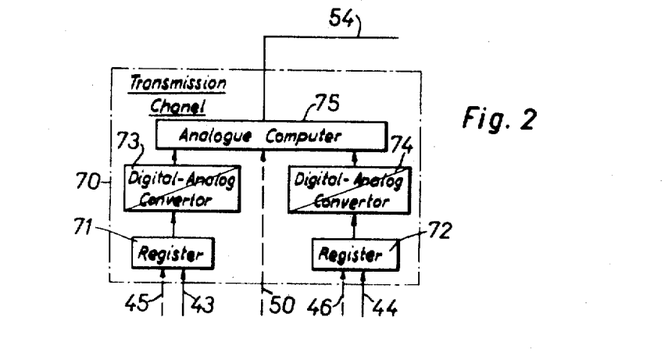
FIG. 2 is a modified version of inventive apparatus wherein the transmission channel is equipped with an analogue operating mixing or overblending device.

The embodiment of transmission channel 70 depicted in FIG. 2 serves for mixing or overblending the analogue reference values. This channel 70 likewise contains two direct storage units 71 and 72, each of which is connected via an information line or conductor 43 and 44, respectively, with the electronic storage means or storage unit and via a control line 45 and 46, respectively, with the control unit. Suitable as the direct storage units are commercially available semiconductor storage or memory components. A respective digital-analogue converter 73 and 74 is connected after each of both direct storage units 71 and 72 respectively. The outputs of these converters 73 and 74 are connected with two separate inputs of an analogue computer 75. Additionally, this analogue computer 75 is connected via the control conductor or line 50 with the control unit and via the information line 54 with the control amplifier 14. The advantage of the transmission channel depicted in FIG. 2 resides in its simpler construction, to which end there can be readily employed commercially available electronic components.

As already briefly mentioned above for the further magnitudes or parameters used for setting a lighting effect, such as the azimuth, elevation, focus and colour there are provided the additional channels 60, 61, 62 and 63, respectively, which in construction correspond to the heretofore described channel 40. Here also the inputs of these additional channels are likewise connected with the storage unit 29 and the control unit 27 and the outputs of which are connected with the associated control amplifiers 15, 16, 17 and 18 respectively, as such has been schematically indicated by the phantom or broken lines.

Finally, it is mentioned that there is still additionally provided a positioning or correction console or desk 65 which is connected via a control line 66 with the control unit 27.

The transmission channels 40, 60, 61, 62 and 63 arranged between the electronic storage means 29 and the different control amplifiers 14, 15, 16, 17 and 18 are only provided for transmitting the reference values of the magnitudes which are to be adjusted or regulated at the floodlight or lamp 10. For each additional floodlight or lamp there is required a further group of transmission channels between the electronic storage unit or storage means and the control cabinets associated with such floodlights.

Now in the description to follow there will be described the course of the inventive technique or method and the function of the above-described apparatus for the adjustment of the brightness or intensity at a floodlight or lamp. Now for this adjustment there is initially formed digital information by depressing one or a number of buttons at the keyboard or button arrangement of the command console 25, which digital information corresponds to the desired brightness or intensity and is stored at the storage unit 29 through the agency of the information line or conductor 28. By depressing a different button at the command console 25 there is delivered a control signal through the agency of the conductor or line 26 to the control unit 27, which then delivers via the conductor 39 a further control signal to the storage unit 29, whereupon the stored value is transmitted further via one of the conductors 43 or 44 to one of both direct storage units 41 or 42 and by means of such to the digital-analogue converter 53. The converter 53 transforms the introduced digital value into a corresponding analogue value which is then delivered via the line or conductor 54 to the control amplifier 14. The analogue value introduced at the control amplifier then serves as a guiding magnitude for the control circuit formed by the adjustment device 12, the actual value-transmitter 13 and the control amplifier 14. The reference value of the brightness which is to be adjusted or set is compared at the control amplifier 14 with the actual value of the brightness and an error signal is formed. This error signal regulates the brightness for such length of time and in the required direction by means of the control circuit 13 until the actual value practically corresponds to the introduced reference value and the error signal finally becomes equal to null. Those versed in the art will be familiar with the actual hardware for the construction of such control circuits and therefore it is not thought necessary to delve into further details thereof.

It should be understood that the described technique or method aspects of the invention during use of a transmission channel corresponding to the arrangement of FIG. 2 does not experience any basic change.

Now as soon as a desired setting or adjustment of the brightness has been found, then, the reference value for such adjustment can be fixedly stored in the electronic storage means 29 by depressing a button at the command console. However, it is also possible to transfer such value by pressing a different button via the conductors 30 or 31 to the perforated tape puncher 32 or to the automatic writing device or recorder 33 or to both, where such information is then printed out or written upon a date carrier. However, it is also possible to initially store all of the reference values at the storage unit 29 which correspond to the lighting effects of a play or a film and then to retrieve such collectively.

Since, as was already discussed above a lighting effect is produced by the action of a number of magnitudes which are to be regulated or adjusted and while utilizing a number of floodlights or lamps, it is necessary to carry out the above-described procedures for each magnitude and for each floodlight in order to adjust a given lighting effect. In order to simplify the storage of the signals produced at the command console in the electronic storage unit and the read-out or retrieval of such information from the storage unit such storage unit or storage means is subdivided into given or fixed storage positions or places for the different floodlights or lamps and the magnitudes which are to be regulated. Each storage position can be directly controlled from the command console so that during the adjustment of a lighting effect or the correction of a magnitude it is not necessary to undertake any complicated addressing of the information. If the values stored in the electronic storage means are printed out at a data carrier in a predetermined sequence and again stored from the data carrier in the same sequence at the storage means, then it is possible to dispense with addressing of the values which are to be printed-out or stored.

If the values which are stored upon a data carrier are supposed to be used for the adjustment of one or more lighting effects then initially the data carrier is introduced into the reading device 34 and the data contained therein is read-out and stored in the electronic storage means 29 through the agency of the information line or conductor 35. As already explained above, by providing a suitable arrangement of the storage positions associated with the different floodlights and the magnitudes which are to be adjusted, it is possible to dispense with special addressing of the values which are to be stored. As soon as the content of the data carrier has been stored at the electronic storage means 29 then there can be retrieved therefrom complete lighting effects or also parts of a lighting effect by means of the command console. As soon as an appropriate button or key is depressed, then, a first reference value is transmitted via the information line 43 to the direct storage unit 41 and from that location to the digital-analogue converter 53 and finally to the control amplifier 14. If the next successive reference value is retrieved from the storage unit 29, then the control unit 27 ensures that this next successive reference value will be delivered via the information line or conductor 44 to the direct storage unit 42. As soon as there has been stored in both direct storage units a respective reference value then the differential computer 49 compares the absolute value of such reference values and thus delivers the correct sign for the change which is to be triggered upon further delivering the reference value stored at the direct storage unit 42. As soon as following depression of an appropriate control button at the command console the content of the direct storage unit 42 has been transferred to the digital-analogue converter the differential computer 49 counts, during a freely selectable cadence or counting cycle delivered via the control line 50 from the control unit 27, the difference between the previous value at the direct storage unit 41 and the new value at the direct storage unit 42. As soon as this difference is equal to null or zero it delivers a control signal which reaches the control unit 27 through the agency of the control conductor or line 50, whereupon by means of a further control signal delivered by the control unit 27 the transfer of the value stored in the direct storage unit 42 to the converter 53 is interrupted. The control signal produced by the differential counter or computer 49 is additionally employed as an indication signal, the appearance of which indicates that the previous value in the direct storage unit 41 can be extinguished and there can be introduced a new value.

The transformed signal is conducted from the digital-analogue converter 53 via the information line or conductor 54 to the control amplifier 14 and at that location brings about the adjustment of the brightness or intensity of the floodlight 10, as such has already been explained heretofore.

When using a transmission line corresponding to FIG. 2, during the adjustment of a lighting effect and likewise by depressing an appropriate button at the command console a first digital reference value is transferred from the storage means 29 via the information line 43 to the direct storage unit 71 and from that location to the digital-analogue converter 73 and via the analogue computer 75 to the control amplifier 14. Thereafter, there is retrieved fom the storage means 29 the reference value corresponding to the next brightness or intensity value and such is stored via the information line or conductor 44 at the direct storage unit 72. For the purpose of mixing or overblending, that is the transition from the first to the next brightness value, by again depressing a control button at the command console the digital value from the director storage unit is transferred into the digital-analogue converter 74 and is delivered in analogue form to the analogue computer 75. The control signal delivered via the conductor 50 to the analogue computer 75 is a variable direct-current voltage.

Since, as likewise already mentioned, for each adjustable magnitude of each floodlight or lamp there is provided a transmission channel it is possible to practically simultaneously vary a random number of magnitudes at a random number of floodlights or lamps.

As will be recognised from what has been discussed above, the novel method of the invention and the apparatus for the performance thereof renders it possible to experimentally determine during one or a number of trials all of the variable correct magnitudes of all floodlights or lamps used for generating a lighting effect and to express such at a data carrier and then at any later period of time to again retrieve such information from the data carrier and to store such in the apparatus and to use this information automatically and for the exact reproduction of such lighting effect or lighting effects. Furthermore, the course of the retrieval of this information is not bound to the timewise exploration of the individual lighting effects upon the data carrier, rather such can be retrieved in any random sequence and at any random spacing in time from one another from the storage means owing to the previous transmission of these values from data carrier into the electronic storage means.

While there is shown and described present preferred embodiments of the invention, it is to be distinctly understood that the invention is not limited thereto but may be otherwise variously embodied and practiced within the scope of the following claims. ACCORDINGLY,

What is claimed is:

1. Apparatus for adjusting a number of floodlights, especially for the illumination of a stage or studio, comprising a command console for the manual input of signals used for setting the value of different parameters such as azimuth, elevation, brightness, focus and color of the light bundle of each of the floodlights, a storage unit, input and output devices for transferring the content of said storage unit onto a data recording means or to transfer data from a recording means to the storage unit, respectively, a control unit for transforming the signals from the command console into reference values for setting the values of the different parameters into instructions for the sequence of operations in the apparatus, each floodlight being provided with a feedback control system for each parameter, the reference value signal input being connected with the output of at least one register having two inputs, one input of the register being connected with the control unit when adjusting the corresponding parameter by means of the command console, the other input of the register being connected with the storage unit when adjusting the corresponding parameter by means of the stored information, the signals at the output of each register being utilized as reference values for the corresponding feedback control system.

* * * * *

REEXAMINATION CERTIFICATE (767th)
United States Patent [19]
von Ballmoos et al.

[11] B1 3,845,351
[45] Certificate Issued    Oct. 13, 1987

[54] METHOD AND APPARATUS FOR THE ADJUSTMENT OF A PLURALITY OF FLOODLIGHTS

[76] Inventors: Fritz von Ballmoos, Todistrasse 44, 8810 Horgen; Traugott Grieder, Siegwaldweg 45, 4125 Riehen, both of Switzerland; Herbert Grohmann, Alexanderstrasse 158, Stuttgart, Fed. Rep. of Germany; Rolf Gutmann, Flughafenstrasse 6, 4000 Basel, Switzerland

Reexamination Request:
No. 90/001,046, Jul. 1, 1986

Reexamination Certificate for:
Patent No.: 3,845,351
Issued: Oct. 29, 1974
Appl. No.: 119,595
Filed: Mar. 1, 1971

[30] Foreign Application Priority Data

Mar. 5, 1970 [CH] Switzerland .......................... 3217/70

[51] Int. Cl.[4] .......................... G05F 1/00; H05B 37/02; H05B 39/04; H05B 41/36
[52] U.S. Cl. .................................... 315/293; 361/253; 315/312; 315/316
[58] Field of Search ............... 315/292, 293, 294, 312, 315/313, 314, 316; 362/253, 238, 239

[56] References Cited

U.S. PATENT DOCUMENTS

| | | | |
|---|---|---|---|
| 1,747,279 | 2/1930 | Andreino . | |
| 1,820,899 | 8/1931 | Greenewalt . | |
| 2,028,110 | 1/1936 | Taylor | 236/74 |
| 2,054,224 | 9/1935 | Levy | 240/61.1 |
| 2,214,728 | 9/1940 | Gille et al. | 240/3.1 |
| 2,659,038 | 10/1953 | Heyer | 315/316 |
| 2,994,802 | 8/1961 | Skirpan | 315/319 |
| 3,049,645 | 8/1962 | Skirpan | 315/316 |
| 3,514,670 | 5/1970 | Isaacs | 315/292 |

OTHER PUBLICATIONS

"Automation in the Theatre" by George C. Izenour May 1955, Yale Scientific Magazine, vol. XXIX, No. 8, pp. 16, 17, 19-22 & 24.
"IEEE Standard Dictionary of Electrical and Electronics Terms", 2nd edition, May 1978.
"Set Lighting by Remote Control", *American Cinematographer*, vol. 32, Nov. 1951, pp. 444, 445, 466-468.
"Centrolite System", Century Lighting.
"Lighting Progress in 1952-53, *Illuminating Engineering*, vol. 49, Mar. 1954, pp. 164-165.
"Motor-Controlled TVM-type Projectors" Data Sheet, Etablissements Adrien de Backer S.A.
Ratchslag #6280.
Bericht der Grossratskommission #6364.
"A New Television Studio", Yukinobu Ujiie and Yasuo Itow, *Journal of the SMPTE, vol. 81, Jul. 1972, pp. 522-528.*

*Primary Examiner*—Saxfield Chatmon

[57] ABSTRACT

An apparatus for adjusting a number of floodlights, especially for the illumination of a stage or studio, in which each of the parameters azimuth, elevation, brightness, focus and color of a bundle of light rays of each floodlight are adjusted to an optimum value for any one of a plurality of lighting effects. A housing attached to each floodlight is provided for the means for adjusting each of the parameters, for generating signals corresponding to the actual values of the respective parameters, and a control circuit for generating a signal according to the difference between a reference value and said actual value to control the associated adjustment means.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

* * * * *

REEXAMINATION CERTIFICATE (1361st)
United States Patent [19]
von Ballmoos et al.

[11] B2 3,845,351

[45] Certificate Issued Oct. 2, 1990

[54] METHOD AND APPARATUS FOR THE ADJUSTMENT OF A PLURALITY OF FLOODLIGHTS

[75] Inventors: Fritz von Ballmoos, Horgen; Traugott Grieder, Riehen, both of Switzerland; Herbert Grohmann, Stuttgart, Fed. Rep. of Germany; Rolf Gutmann, Basel, Switzerland

[73] Assignee: Varible-Parameter Fixture Dev. Corp., New York, N.Y.

Reexamination Request:
No. 90/001,832, Aug. 28, 1989

Reexamination Certificate for:
Patent No.: 3,845,351
Issued: Oct. 29, 1974
Appl. No.: 119,595
Filed: Mar. 1, 1971

Reexamination Certificate B1 3,845,351 issued Oct. 13, 1987.

[51] Int. Cl.$^5$ ............................. G05F 1/00; F21P 5/00
[52] U.S. Cl. .................................... 315/293; 315/318; 362/253
[58] Field of Search ............... 315/293, 318, 316, 317, 315/292, 295; 362/253

[56] References Cited

U.S. PATENT DOCUMENTS

| | | | |
|---|---|---|---|
| 2,028,110 | 1/1936 | Taylor | 236/74 |
| 2,054,224 | 9/1936 | Levy | 240/61.1 |
| 2,097,537 | 11/1937 | Snyder | 240/3 |
| 2,214,728 | 9/1940 | Gille et al. | 240/3.1 |
| 2,294,804 | 8/1961 | Skirpan | 315/319 |
| 2,798,984 | 7/1957 | Izenour | 315/179 |
| 3,004,193 | 10/1961 | Bentham | 315/295 |
| 3,221,214 | 11/1965 | Wolff et al. | 315/292 |
| 3,265,932 | 8/1966 | Pettersson et al. | 315/292 |
| 3,448,338 | 6/1969 | Bentham et al. | 315/295 |
| 3,491,263 | 1/1970 | Isaacs | 315/293 |
| 3,618,022 | 11/1971 | Isaacs | 340/149 |
| 3,634,662 | 7/1972 | Slawson | 235/151.11 |
| 3,668,467 | 6/1972 | Isaac | 315/292 |
| 3,668,653 | 6/1972 | Fair et al. | 235/151.11 |

FOREIGN PATENT DOCUMENTS

| | | |
|---|---|---|
| 1185694 | 1/1965 | Fed. Rep. of Germany . |
| 989385 | 4/1965 | United Kingdom . |
| 1179001 | 1/1970 | United Kingdom . |
| 1224236 | 3/1971 | United Kingdom . |
| 1332176 | 10/1973 | United Kingdom . |
| 1332412 | 10/1973 | United Kingdom . |

OTHER PUBLICATIONS

"Automation in the Theatre", George C. Izenour, *Yale Scientific Magazine*, vol. XXIX, No. 8, pp. 16–24, May, 1955.
IEEE Standard Dictionary of Electrical and Electronic Terms, Second Edition.
Memo–Q Brochure, Feb. 1969.
Lucke, New Dimmer Controls for TV Studio Lighting, 1967.
Isaacs et al, A Solid State Studio Lighting Control System, 1966.
Q-File Brochure and Dimmers for Television and Stage Lighting Control Data Sheet, date unknown.
Remote Control Systems in Television, date unknown.
Strand Type DL/IDM Brochure, date unknown.

*Primary Examiner*—Eugene R. LaRoche

[57] ABSTRACT

An apparatus for adjusting a number of floodlights, especially for the illumination of a stage or studio, in which each of the parameters azimuth, elevation, brightness, focus and color of a bundle of light rays of each floodlight are adjusted to an optimum value for any one of a plurality of lighting effects. A housing attached to each floodlight is provided for the means for adjusting each of the parameters, for generating signals corresponding to the actual values of the respective parameters, and a control circuit for generating a signal according to the difference between a reference value and said actual value to control the associated adjustment means.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

* * * * *